United States Patent
Lynn

(10) Patent No.: US 11,358,185 B1
(45) Date of Patent: Jun. 14, 2022

(54) METHOD FOR MAINTAINING AND CLEANING AIR SCRUBBERS

(71) Applicant: Daniel W. Lynn, Omaha, NE (US)

(72) Inventor: Daniel W. Lynn, Omaha, NE (US)

(*) Notice: Subject to any disclaimer, the term of this patent is extended or adjusted under 35 U.S.C. 154(b) by 0 days.

(21) Appl. No.: 16/744,877

(22) Filed: Jan. 16, 2020

(51) Int. Cl.
*B08B 9/00* (2006.01)
*B01D 53/18* (2006.01)

(52) U.S. Cl.
CPC ............... *B08B 9/00* (2013.01); *B01D 53/18* (2013.01); *B08B 2203/005* (2013.01); *B08B 2209/00* (2013.01)

(58) Field of Classification Search
None
See application file for complete search history.

(56) References Cited

U.S. PATENT DOCUMENTS

| | | | | |
|---|---|---|---|---|
| 2005/0284300 A1* | 12/2005 | Marusic | ............... | B01D 47/06 96/271 |
| 2010/0252415 A1* | 10/2010 | Lynn | ............... | C11D 3/50 204/176 |
| 2012/0219480 A1* | 8/2012 | Simpson | ............... | B01D 47/14 423/210 |
| 2013/0341285 A1* | 12/2013 | Marion | ............... | C02F 1/008 210/743 |
| 2015/0314021 A1* | 11/2015 | Botos | ............... | A61L 2/183 422/20 |

* cited by examiner

*Primary Examiner* — Mikhail Kornakov
*Assistant Examiner* — Pradhuman Parihar
(74) *Attorney, Agent, or Firm* — Nasr Patent Law LLC; Faisal K. Abou-Nasr

(57) ABSTRACT

A method for maintaining and cleaning air scrubbers. The air scrubbers are maintained and cleaned by applying an aqueous ozone solution thereto.

1 Claim, No Drawings

METHOD FOR MAINTAINING AND CLEANING AIR SCRUBBERS

BACKGROUND OF THE INVENTION

Field of the Invention

The present invention relates to a method for maintaining and cleaning air scrubbers using an aqueous ozone solution.

Description of the Related Art

Air scrubbers are used in industrial operations to clean air and gases. The air and gases to be cleaned are directed to the air scrubber. Fluids are sprayed in the air scrubber to help clean the air and gases. The fluids used in the air scrubber tend to get dirty from the industrial air and gases. Further, biological growth tends to occur in the air scrubber due to the moist and warm environment.

Traditionally, chlorine is the sanitizing product of choice for use in maintaining air scrubbers and reducing the biological growth. However, chlorine has many substantial drawbacks. Such chemicals are expensive, unsafe to handle, and require proper management of buying, ordering and storage. These chemicals also require constant monitoring by trained personnel. Moreover, chlorine is not always effective.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

Described herein is a method for using an aqueous ozone solution in air scrubber systems. The method generates an aqueous ozone solution for application to the air scrubber. The method provides a safe, economical, easy to handle, and environmentally friendly solution for maintaining and cleaning air scrubbers. The method herein cleans the air scrubber, supplies a continuous sanitizer created on-site without any additional chemicals to the air scrubber, and reduces the labor costs attributed to maintaining and cleaning an air scrubber.

The use of an aqueous ozone solution in an air scrubber serves many functions. The aqueous ozone solution keeps the fluid of the air scrubber in pristine condition. The aqueous ozone solution also provides for the control of biological growth in the fluids used in the air scrubber as well as on the components of the air scrubber.

In one aspect, a method for maintaining an air scrubber is described. The method includes forming an aqueous ozone solution. The aqueous ozone solution is directed to an air scrubber. The aqueous ozone solution is circulated through the air scrubber.

These and other objects will be apparent to those skilled in the art.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Described herein is a method for using ozone in air scrubbers. The method generates an aqueous ozone solution and circulates the aqueous ozone solution in the air scrubber. The method provides for the control of biological growth in the air scrubber. The use of an aqueous ozone solution maintains a level of sanitizer in the fluid used in the air scrubber.

The use of aqueous ozone solution provides additional advantages by saving money spent on chemicals. The use of the aqueous ozone solution may replace the use of biocides in the cooling system. The maintenance of a typical air scrubber cooling water system may cost thousands of dollars annually in chemicals and labor, and such costs are reduced by the methods and systems herein.

The use of the method of using the aqueous ozone solution may replace other conventional chemicals and treatments typically used for air scrubber. The aqueous ozone solution may replace the chlorine that is often used in the air scrubber.

The aqueous ozone solution may be supplied to the air scrubber in a variety of different configurations. The aqueous ozone solution may fluidly connect with the basin via housing, piping, or other conduits. The aqueous ozone solution may mix with the water in the basin of the air scrubber. The air scrubber may circulate the aqueous ozone solution from the basin to the fluid supply line and to the sprayer thereof. The aqueous ozone solution may also be directed to one or more additional sprayers positioned above the air scrubber media. The one or more additional sprayers may continually or intermittently spray the air scrubbers with the aqueous ozone solution. Additional sprayers may also be employed to spray a demisting panel and/or the air scrubber floor. The aqueous ozone solution may also be directly added to the fluid supply line of the air scrubber. For example, hosing, piping, or other conduits may fluidly connect the aqueous ozone solution generator with the fluid supply line of the air scrubber.

The aqueous ozone solution system may flow into the air scrubber at a flow rate of approximately 1 to 15 GPM at approximately 5 to 15 ppm. This maintains a standard ORP level that provides for control of biological growth. The flow rates and ORP may be adjusted as needed.

The aqueous ozone generator generates the supply of aqueous ozone solution. A municipal water supply may supply the ozone generator with water to be ozonated. The generator includes an oxygen concentrator to produce oxygen gas, and the oxygen concentrator is in supply communication with an ozone generator to generate ozone gas from the oxygen gas. An injector pump supplies an injector with water from the water supply. The injector injects the fluid with the ozone gas from the ozone generator to produce an ozonated fluid. A degassing system removes excess ozone gas from the ozonated fluid. An ozone destruct unit destroys the excess ozone gas. A reaction vessel processes the ozonated fluid. The aqueous solution is directed to the air scrubber via an aqueous ozone solution supply line and mixed with the water therein.

ORP sensors and monitors may be integrated into the air scrubber system to monitor and measure ORP levels of the aqueous ozone solution. Depending on ORP readings, the ozone generator may modulate the concentration or volume of the aqueous ozone solution provided to the air scrubber. Further, the ORP level may be raised by increasing the flow and/or concentration of the aqueous ozone solution into the air scrubber system.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A method of cleaning an air scrubber system, comprising:
    generating ozone gas;
    forming an aqueous ozone solution by injecting the ozone gas into water;
    removing excess ozone gas from the aqueous ozone solution with a degassing system to control an ozone concentration of the aqueous ozone solution to 5 to 15 parts per million (ppm);
    directing the aqueous ozone solution to the air scrubber at a flow rate of 1 to 15 gallons per minute (GPM);
    applying the aqueous ozone solution onto an air scrubber media with a sprayer;
    collecting the aqueous ozone solution in a portion of the air scrubber;
    circulating the aqueous ozone solution through the air scrubber;
    monitoring an oxidation reduction potential (ORP) of the aqueous ozone solution using an ORP sensor integrated within the air scrubber;
    based on ORP readings, modulating a concentration or volume of the aqueous ozone solution provided to the air scrubber;
    applying additional aqueous ozone solution onto the air scrubber media with one or more additional sprayers positioned above the air scrubber media; and
    applying additional aqueous ozone solution to a demisting panel of the air scrubber with another one or more additional sprayers.

* * * * *